United States Patent
Propheter-Hinckley

(10) Patent No.: US 10,408,082 B2
(45) Date of Patent: Sep. 10, 2019

(54) AIRFOIL WITH RETENTION POCKET HOLDING AIRFOIL PIECE

(71) Applicant: United Technologies Corporation, Farmington, CT (US)

(72) Inventor: Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 376 days.

(21) Appl. No.: 15/354,259

(22) Filed: Nov. 17, 2016

(65) Prior Publication Data

US 2018/0135444 A1 May 17, 2018

(51) Int. Cl.
| | |
|---|---|
| F01D 17/16 | (2006.01) |
| F04D 29/54 | (2006.01) |
| F04D 29/64 | (2006.01) |
| F01D 5/28 | (2006.01) |
| F01D 9/04 | (2006.01) |
| F01D 11/00 | (2006.01) |
| F04D 29/32 | (2006.01) |
| F04D 29/56 | (2006.01) |

(52) U.S. Cl.
CPC ........... *F01D 17/162* (2013.01); *F01D 5/284* (2013.01); *F01D 9/042* (2013.01); *F01D 11/005* (2013.01); *F04D 29/322* (2013.01); *F04D 29/542* (2013.01); *F04D 29/644* (2013.01); *F04D 29/563* (2013.01); *F05D 2260/30* (2013.01); *F05D 2260/38* (2013.01); *F05D 2260/941* (2013.01); *Y02T 50/672* (2013.01)

(58) Field of Classification Search
CPC ..... F01D 5/18; F01D 5/15; F01D 5/14; F05D 2230/80; F05D 2240/303
See application file for complete search history.

(56) References Cited

U.S. PATENT DOCUMENTS

| | | | |
|---|---|---|---|
| 3,215,511 A | 11/1965 | Chisholm | |
| 3,315,941 A * | 4/1967 | Davies | F01D 5/284 |
| | | | 415/178 |
| 3,619,077 A | 11/1971 | Wile et al. | |
| 4,137,008 A | 1/1979 | Grant et al. | |
| 4,247,259 A | 1/1981 | Saboe et al. | |
| 4,396,349 A | 8/1983 | Hueber | |

(Continued)

FOREIGN PATENT DOCUMENTS

| | | | |
|---|---|---|---|
| EP | 473536 A1 * | 4/1992 | |
| EP | 0764764 | 3/1997 | |

(Continued)

OTHER PUBLICATIONS

U.S. Appl. No. 13/429,474, filed Mar. 26, 2012.

(Continued)

*Primary Examiner* — Jason D Shanske
*Assistant Examiner* — Hakeem M Abdellaoui
(74) *Attorney, Agent, or Firm* — Carlson, Gaskey & Olds, P.C.

(57) ABSTRACT

An airfoil includes an airfoil body that has a retention pocket and an airfoil piece disposed in the retention pocket. The retention pocket secures the airfoil piece in place. The airfoil piece defines a portion of an airfoil profile of an airfoil section of the airfoil body.

19 Claims, 4 Drawing Sheets

(56) References Cited

U.S. PATENT DOCUMENTS

| | | | |
|---|---|---|---|
| 4,914,794 A | 4/1990 | Strangman | |
| 5,348,446 A * | 9/1994 | Lee | C30B 11/002 29/889.72 |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,827,045 A * | 10/1998 | Beeck | F01D 5/284 416/96 A |
| 5,951,892 A | 9/1999 | Wolfla et al. | |
| 6,000,906 A * | 12/1999 | Draskovich | F01D 5/3084 415/189 |
| 6,102,656 A | 8/2000 | Nissley et al. | |
| 6,200,092 B1 * | 3/2001 | Koschier | F01D 5/146 415/191 |
| 6,224,963 B1 | 5/2001 | Strangman | |
| 6,316,078 B1 | 11/2001 | Smialek | |
| 6,447,254 B1 * | 9/2002 | Holowczak | B64C 11/205 416/224 |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 * | 3/2004 | Morrison | F01D 5/189 415/115 |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,256,088 B2 * | 9/2012 | James | F01D 9/044 29/446 |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 10,036,264 B2 * | 7/2018 | McCaffrey | F01D 9/02 |
| 2008/0159850 A1 | 7/2008 | Tholen et al. | |
| 2010/0136258 A1 | 6/2010 | Strock et al. | |
| 2010/0232946 A1 * | 9/2010 | Propheter-Hinckley | F01D 5/189 415/177 |
| 2015/0086376 A1 * | 3/2015 | Fandrei, II | F01D 5/28 416/224 |
| 2016/0090851 A1 | 3/2016 | Carr et al. | |
| 2016/0160659 A1 * | 6/2016 | Obuchi | F01D 5/147 415/200 |

FOREIGN PATENT DOCUMENTS

| | | | |
|---|---|---|---|
| EP | 1149982 A2 * | 10/2001 | F04D 5/189 |
| EP | 1764481 | 3/2007 | |
| EP | 2105579 | 9/2009 | |
| EP | 2853688 | 4/2015 | |
| GB | 2272453 | 5/1994 | |
| JP | 61066802 | 4/1986 | |
| JP | 05321602 | 12/1993 | |
| JP | 05321602 A * | 12/1993 | B23P 6/005 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202447.3 completed Mar. 15, 2018.

* cited by examiner

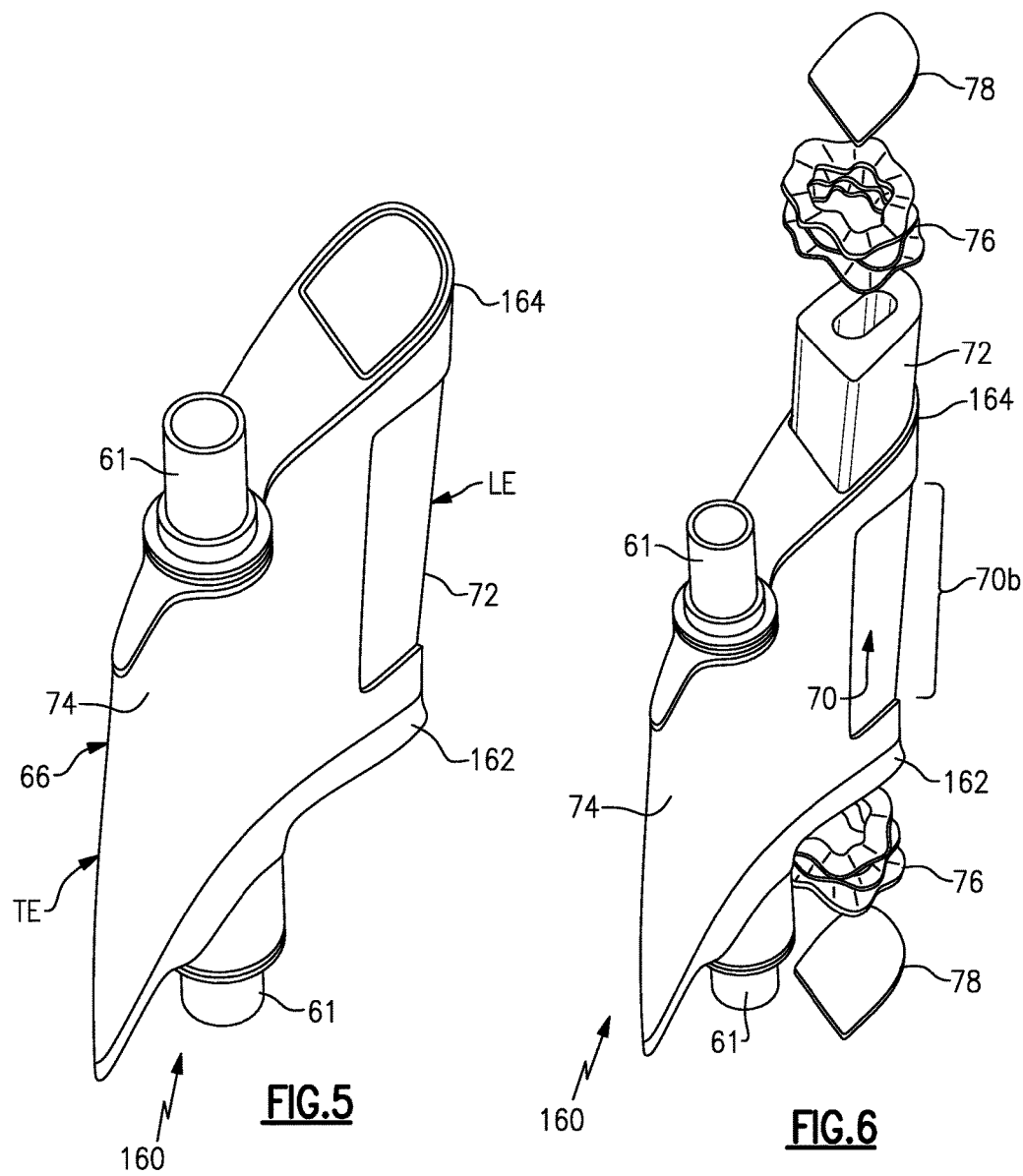

US 10,408,082 B2

AIRFOIL WITH RETENTION POCKET HOLDING AIRFOIL PIECE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil body that has a retention pocket and an airfoil piece disposed in the retention pocket. The retention pocket secures the airfoil piece in place. The airfoil piece defines a portion of an airfoil profile of an airfoil section of the airfoil body.

In a further embodiment of any of the foregoing embodiments, the airfoil section partially defines the retention pocket.

In a further embodiment of any of the foregoing embodiments, the airfoil piece defines a leading end of the airfoil profile.

In a further embodiment of any of the foregoing embodiments, the airfoil piece is formed of ceramic.

In a further embodiment of any of the foregoing embodiments, the airfoil section includes an airfoil wall that defines a trailing end, a pressure side, and a suction side of the airfoil profile, and the airfoil wall is formed of metal.

In a further embodiment of any of the foregoing embodiments, the airfoil piece is non-rigidly secured in the retention pocket.

In a further embodiment of any of the foregoing embodiments, the retention pocket includes an open window through which the airfoil piece is exposed.

A further embodiment of any of the foregoing embodiments includes at least one bias member in the retention pocket adjacent the airfoil piece.

A further embodiment of any of the foregoing embodiments includes a cover piece retaining the at least one bias member in compression against the airfoil piece.

In a further embodiment of any of the foregoing embodiments, the retention pocket spans from a first endwall section, through the airfoil section, and into a second endwall section.

In a further embodiment of any of the foregoing embodiments, the airfoil piece is hollow.

In a further embodiment of any of the foregoing embodiments, the airfoil piece defines a leading end of the airfoil profile. The airfoil piece is formed of ceramic and is hollow. The airfoil section includes an airfoil wall that defines a trailing end, a pressure side, and a suction side of the airfoil profile. The airfoil wall is formed of metal, and the airfoil piece is non-rigidly secured in the retention pocket.

A gas turbine engine according to an example of the present disclosure includes a compressor section, a combustor in fluid communication with the compressor section, and a turbine section in fluid communication with the combustor. One of the turbine section or the compressor section includes an airfoil that has an airfoil body with a retention pocket and an airfoil piece disposed in the retention pocket. The retention pocket secures the airfoil piece in place. The airfoil piece defines a portion of an airfoil profile of an airfoil section of the airfoil body.

In a further embodiment of any of the foregoing embodiments, the airfoil section partially defines the retention pocket, and the airfoil piece defines a leading end of the airfoil profile.

In a further embodiment of any of the foregoing embodiments, the airfoil piece is formed of ceramic. The airfoil section includes an airfoil wall that defines a trailing end, a pressure side, and a suction side of the airfoil profile, and the airfoil wall is formed of metal.

In a further embodiment of any of the foregoing embodiments, the airfoil piece is non-rigidly secured in the retention pocket.

A further embodiment of any of the foregoing embodiments includes at least one bias member in the retention pocket adjacent the airfoil piece.

A method of assembling an airfoil according to an example of the present disclosure includes using a retention pocket of an airfoil body to secure an airfoil piece in place. The airfoil piece defines a portion of an airfoil profile of an airfoil section of the airfoil body.

A further embodiment of any of the foregoing embodiments includes radially sliding the airfoil piece into the retention pocket.

A further embodiment of any of the foregoing embodiments includes using a bias member in the retention pocket adjacent the airfoil piece to non-rigidly secure the airfoil piece in the retention pocket.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5 illustrates another example airfoil, which has highly contoured endwall sections.

FIG. 6 illustrates an exploded view of the airfoil of FIG. 5.

DETAILED DESCRIPTION

Figure 1:
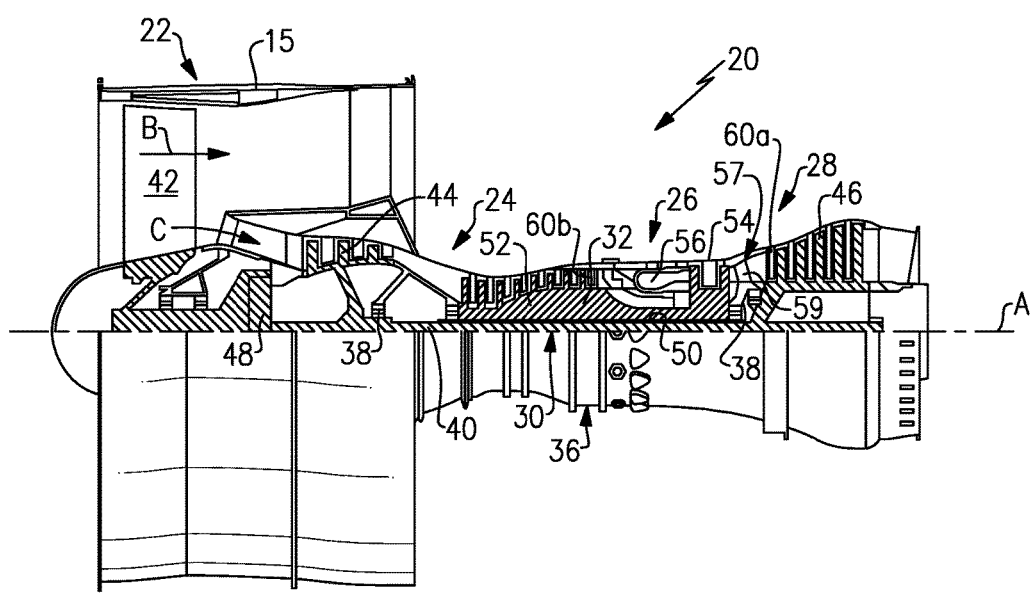
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

In addition, gas turbine engine operational capability, and the overall efficiency as measured by way of thrust specific fuel consumption (TSFC), may be improved by tailoring the overall pressure ratio of the engine at specific operating conditions via the use of variable area turbine vanes. For example, increasing the flow area of a high pressure turbine variable vane row by rotating some or all of the first stage high pressure turbine vanes to a more open position reduces the engine overall pressure ratio, reducing the high pressure compressor exit temperature, and will permit more fuel to be burned and the aircraft to fly faster. In another example, reducing the flow area of a high pressure turbine variable vane row by rotating some or all of the first stage high pressure turbine vanes to a more closed position increases the engine overall pressure ratio, thus increasing the thermal efficiency of the engine core, allowing the engine to burn less fuel while the aircraft cruises at subsonic speeds.

Figures 2, 3:
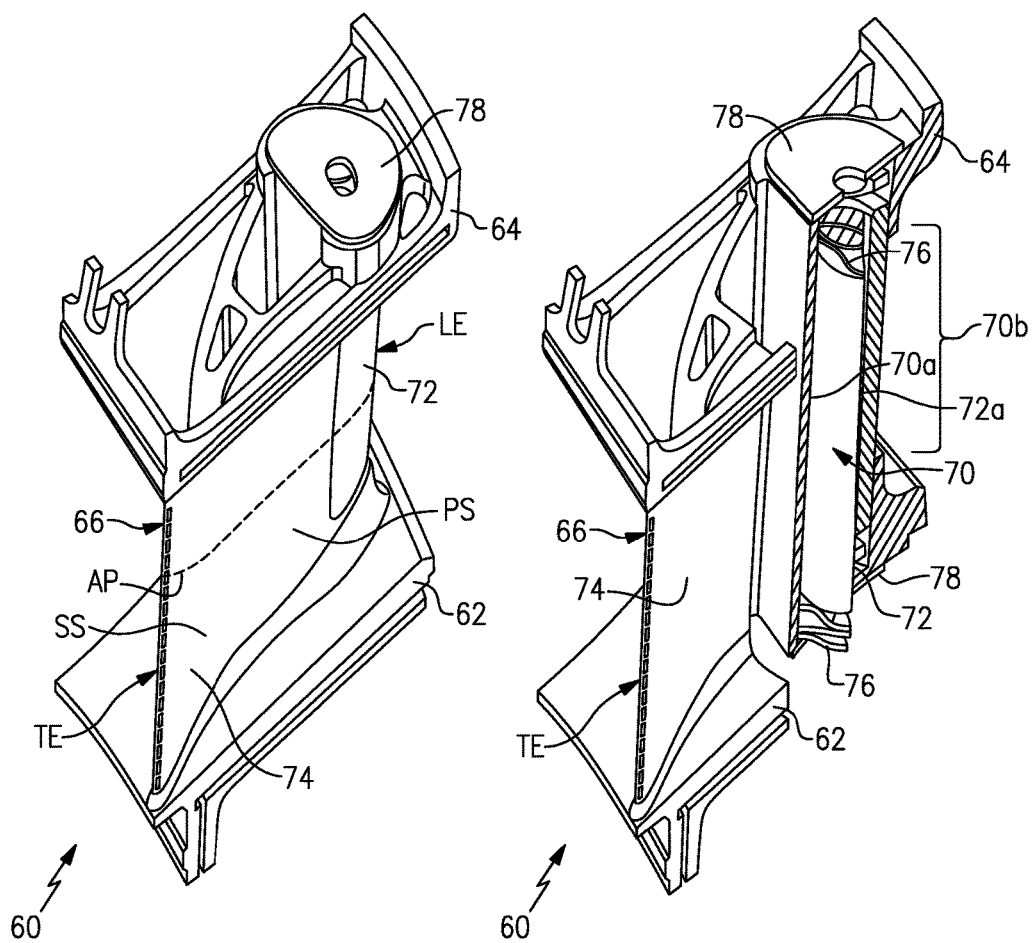
FIG. 2 illustrates an example airfoil in the gas turbine engine.
FIG. 3 illustrates an exploded view of an airfoil.

FIG. 2 illustrates an example airfoil 60 used in the engine 20. For instance, the airfoil 60 can be a turbine vane, as represented at 60a in FIG. 1, or a compressor vane, as represented at 60b in FIG. 1. In this example, the airfoil 60 is a static vane, but the airfoil 60 could alternatively be a variable vane that can be pivoted. As will be appreciated, although the examples herein are described in the context of a vane, this disclosure is not limited to vanes, and the examples may also be applicable to blades or other airfoils that are exposed to high temperatures.

The airfoil 60 includes a body which generally includes first and second endwall sections 62/64 and an airfoil section 66 that extends radially between the endwall sections 62/64. The airfoil section 66 defines an airfoil profile, AP, which is the peripheral shape of the airfoil section 66 when viewed in a radial direction. For example, the airfoil profile has a wing-like shape that provides a reaction force via Bernoulli's principle with regard to flow over the airfoil section 66. The airfoil profile AP generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

Referring also to FIG. 3, which shows the airfoil 60 with a portion cut away, the airfoil body includes a retention pocket 70 and an airfoil piece 72 disposed in the retention pocket 70. In this example, the airfoil piece 72 is hollow and includes an internal passage 72a, which may be utilized for conveying bleed cooling flow, if used. The retention pocket 70 secures the airfoil piece 72 in place.

The airfoil piece 72 defines a portion of the airfoil profile AP of the airfoil section 66. The remaining portion of the airfoil profile AP is formed by an airfoil wall 74 of the airfoil section 66. In this example, the airfoil piece 72 forms the leading end (LE) of the airfoil profile AP, and the airfoil wall 74 forms the trailing end (TE), the pressure side (PS), and the suction side (SS) of the airfoil profile AP. It is to be understood that although the airfoil piece 72 and airfoil wall 74 are shown and form the complete airfoil profile AP, the airfoil piece 72 could form a different portion of the airfoil profile and/or the airfoil piece 72 and airfoil wall 74 could form less than the complete airfoil profile AP.

The retention pocket 70 includes a sidewall 70a that defines a cavity in which the airfoil piece 72 is disposed. The cavity is generally complimentary in cross-section to the cross-sectional shape of the airfoil piece 72. In this example, the retention pocket 70 spans from the first endwall section 62, through the airfoil section 66, and into the second endwall section 64. At the leading end (LE), the retention pocket 70 defines an open window 70b. The airfoil piece 72 is exposed in the core gas path through the open window 70b.

The airfoil piece 72 is non-rigidly secured in the retention pocket 70. For instance, one or more bias members 76 are disposed in the retention pocket 70 adjacent the airfoil piece 72. In this example, the bias members 76 are wave springs, and two to three wave springs are used at the opposed ends of the airfoil piece 72. One or more cover pieces 78 retain the bias members 76 in compression against the airfoil piece 72. For example, the cover pieces 78 are bonded to the first and/or second endwall sections 62/64, such as by welding or brazing, to keep the bias members 76 in compression. In particular, during engine operation there is thermal growth and contraction of the airfoil piece 72, the first endwall section 62, and the second endwall section 64. Where dissimilar materials are used for these components, such as metal and ceramic, there may be a thermal growth/contraction mismatch. The bias member or members 76 maintain compression force over the range of thermal growths and contractions during engine operation. For instance, the thermal growths and contractions can readily be determined from defined maximum and minimum temperatures during engine operation in order to calculate or estimate a thermal growth/contraction mismatch distance. The bias member or members 76 are configured to provide the compression force over at least that distance.

The materials of which the airfoil 60 is formed of may be selected to enhance the performance. For example, the airfoil piece 72 and airfoil wall 74 may be formed of a ceramic or of a metal. In the example shown, the airfoil piece 72 is ceramic and the airfoil wall 74 is metal. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic. Ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

If enhanced thermal or environmental resistance is desired, the airfoil piece 72 and/or airfoil wall 74 may be coated with a thermal and/or environmental barrier ceramic coating, including but not limited to segmented coatings. As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

As can be appreciated from this disclosure, the airfoil 60 has relatively few components and is thus easy to assemble. Moreover, different locations of the airfoil profile and can formed of different materials that are tailored to the environmental conditions at the particular locations.

Figure 4:
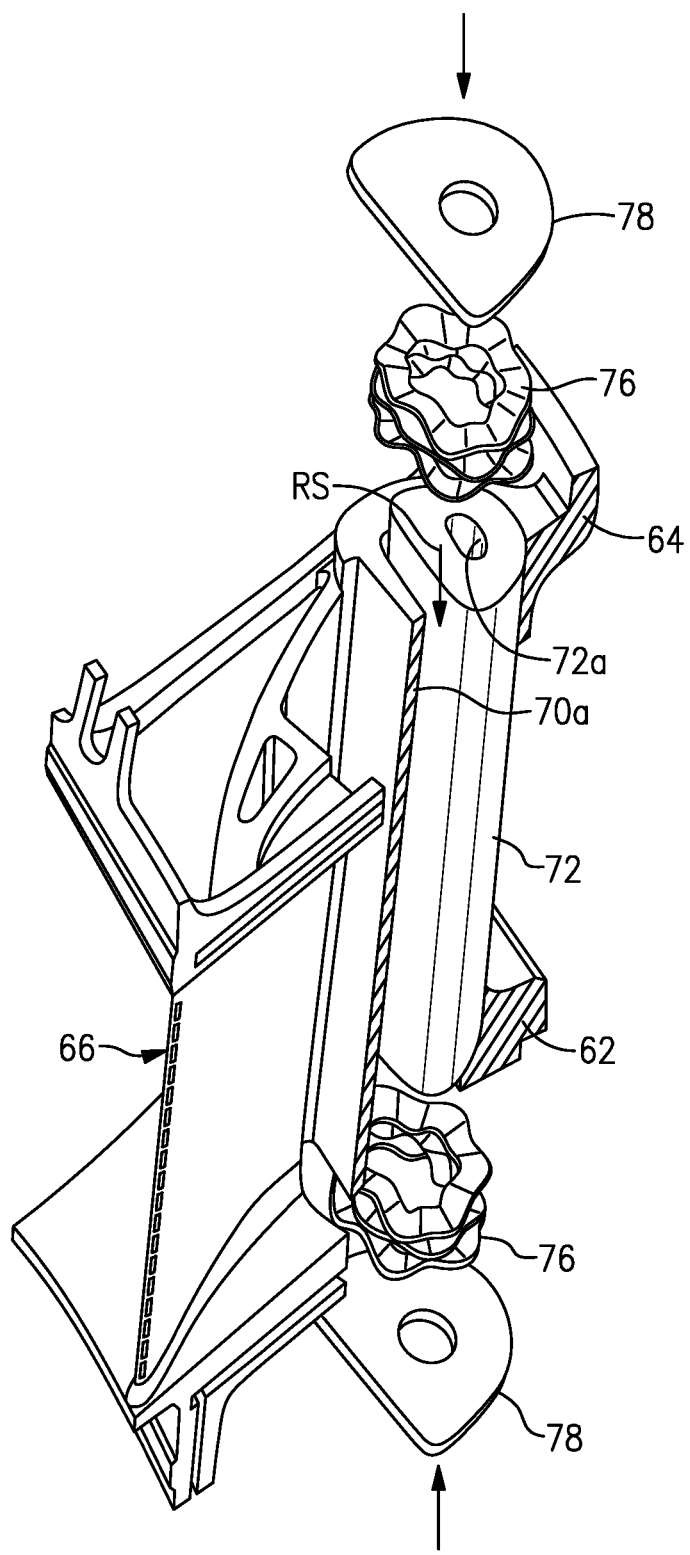
FIG. 4 illustrates an exploded view of another example airfoil that has two tension members.

FIG. 4 illustrates an exploded view of the airfoil 60 and method of assembling the airfoil 60. The method of assembly may include radially sliding the airfoil piece 72 into the retention pocket 70, as represented at RS. The bias members 76 are positioned near the ends of the airfoil piece 72, and then the cover pieces 78 are secured to the first and second endwall sections 62/64. In this regard, should the airfoil piece 72 require replacement, the airfoil 60 can be disassembled by removing one or more of the cover pieces 78, the airfoil piece 72 can be replaced with a new one, and the airfoil 60 can be reassembled by bonding the cover pieces 78 or new cover pieces. Accordingly, the airfoil piece 72 can be produced individually as a new part for an original airfoil or as a replacement part in an existing airfoil.

FIGS. 5 and 6 illustrate another example airfoil 160. In this disclosure, like reference numerals designate like elements where appropriate and reference numerals with the addition of one-hundred or multiples thereof designate modified elements that are understood to incorporate the same features and benefits of the corresponding elements. In this example, the endwall sections 162/164 are highly contoured and represent a variable vane configuration. For example, the endwall sections 162/164 have spindles 61 about which the airfoil 160 can be pivoted.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil body including first and second endwall sections, an airfoil section extending between the first and second endwall sections, a retention pocket extending through the airfoil section and into each of the first and second endwall sections, and an airfoil piece disposed in the retention pocket and extending into each of the first and second endwall sections, the retention pocket securing the airfoil piece in place, the airfoil piece defining a portion of an airfoil profile of the airfoil section of the airfoil body, and the retention pocket defining an open window through which the airfoil piece is exposed.

2. The airfoil as recited in claim 1, wherein the airfoil section partially defines the retention pocket.

3. The airfoil as recited in claim 1, wherein the airfoil piece defines a leading end of the airfoil profile.

4. The airfoil as recited in claim 1, wherein the airfoil piece is formed of ceramic.

5. The airfoil as recited in claim 4, wherein the airfoil section includes an airfoil wall that defines a trailing end, a pressure side, and a suction side of the airfoil profile, and the airfoil wall is formed of metal.

6. The airfoil as recited in claim 1, wherein the airfoil piece is non-rigidly secured in the retention pocket.

7. The airfoil as recited in claim 1, further comprising at least one bias member in the retention pocket adjacent the airfoil piece.

8. The airfoil as recited in claim 1, further comprising a cover piece retaining the at least one bias member in compression against the airfoil piece.

9. The airfoil as recited in claim 1, wherein the airfoil piece is hollow.

10. The airfoil as recited in claim 1, wherein the airfoil piece defines a leading end of the airfoil profile, the airfoil piece is formed of ceramic and is hollow, the airfoil section includes an airfoil wall that defines a trailing end, a pressure side, and a suction side of the airfoil profile, the airfoil wall is formed of metal, and the airfoil piece is non-rigidly secured in the retention pocket.

11. The airfoil as recited in claim 1, further comprising at least one wave spring trapped in the cavity of the first endwall section adjacent the airfoil piece
such that the at least one wave spring maintains a compression force on the airfoil piece.

12. A gas turbine engine comprising:
a compressor section;
a combustor in fluid communication with the compressor section; and a turbine section in fluid communication with the combustor,
at least one of the turbine section or the compressor section including an airfoil having an airfoil body including first and second endwall sections, an airfoil section
extending between the first and second endwall sections, a retention pocket extending through the airfoil section and into each of the first and second endwall sections, and an airfoil piece disposed in the retention pocket and extending into each of the first and second endwall sections, the retention pocket securing the airfoil piece in place, the airfoil piece defining a portion of an airfoil profile of the airfoil section of the airfoil body, and the retention pocket defining an open window through which the airfoil piece is exposed.

13. The gas turbine section as recited in claim 12, wherein the airfoil section partially defines the retention pocket, and the airfoil piece defines a leading end of the airfoil profile.

14. The gas turbine engine as recited in claim 13, wherein the airfoil piece is formed of ceramic, the airfoil section includes an airfoil wall that defines a trailing end, a pressure side, and a suction side of the airfoil profile, and the airfoil wall is formed of metal.

15. The gas turbine engine as recited in claim 14, wherein the airfoil piece is non-rigidly secured in the retention pocket.

16. The gas turbine engine as recited in claim 15, further comprising at least one bias member in the retention pocket adjacent the airfoil piece.

17. A method of assembling an airfoil, the method comprising:
using a retention pocket of an airfoil body to secure an airfoil piece in place, wherein the airfoil piece defines a portion of an airfoil profile of an airfoil section of the airfoil body, and the retention pocket defining an open window through which the airfoil piece is exposed, the airfoil body including first and second endwall sections, an airfoil section extending between the first and second endwall sections, the retention pocket extending through the airfoil section and into each of the first and second endwall sections, and the airfoil piece extending into each of the first and second endwall sections.

18. The method as recited in claim 17, including radially sliding the airfoil piece into the retention pocket.

19. The method as recited in claim 17, including using a bias member in the retention pocket adjacent the airfoil piece to non-rigidly secure the airfoil piece in the retention pocket.

* * * * *